US009155286B2

(12) United States Patent
Wickens et al.

(10) Patent No.: US 9,155,286 B2
(45) Date of Patent: Oct. 13, 2015

(54) MOTION CONTROL WEIGHTED CANINE FITNESS GARMENT

(71) Applicant: BALL DYNAMICS INTERNATIONAL, LLC, Longmont, CO (US)

(72) Inventors: Krista M. Wickens, Ogden, UT (US); Donald J. Standing, Smithfield, UT (US)

(73) Assignee: BALL DYNAMICS INTERNATIONAL, LLC, Longmont, CO (US)

(*) Notice: Subject to any disclaimer, the term of this patent is extended or adjusted under 35 U.S.C. 154(b) by 0 days.

(21) Appl. No.: 13/917,081

(22) Filed: Jun. 13, 2013

(65) Prior Publication Data

US 2013/0333628 A1    Dec. 19, 2013

Related U.S. Application Data

(60) Provisional application No. 61/690,053, filed on Jun. 18, 2012.

(51) Int. Cl.
*A01K 15/02* (2006.01)
*A01K 13/00* (2006.01)

(52) U.S. Cl.
CPC .............. *A01K 15/02* (2013.01); *A01K 13/006* (2013.01); *A01K 15/027* (2013.01)

(58) Field of Classification Search
CPC .................. A01K 13/06; A01K 27/002; A61F 2007/0238; A41D 13/0053; A41D 13/051; A41D 13/0058; A41D 13/01; A41D 20/005
USPC ................................................ 119/702, 850
See application file for complete search history.

(56) References Cited

U.S. PATENT DOCUMENTS

| | | | |
|---|---|---|---|
| 3,141,443 A * | 7/1964 | Huey | 119/854 |
| 4,658,442 A | 4/1987 | Tomlinson et al. | |
| 5,010,596 A | 4/1991 | Brown et al. | |
| 5,068,921 A | 12/1991 | Jones | |
| 5,127,213 A | 7/1992 | Petronio | |
| 5,144,694 A * | 9/1992 | Conrad Da oud et al. | 2/69 |
| 5,427,563 A * | 6/1995 | Manning | 450/79 |
| 5,447,124 A * | 9/1995 | Pollock et al. | 119/850 |
| 5,537,954 A * | 7/1996 | Beeghly et al. | 119/850 |
| 5,769,030 A * | 6/1998 | Acoff | 119/712 |
| 5,782,790 A * | 7/1998 | Allen | 602/75 |
| 5,937,441 A | 8/1999 | Raines | |
| 5,946,726 A * | 9/1999 | Green | 2/109 |
| 5,951,446 A | 9/1999 | Monforte | |
| 5,968,003 A * | 10/1999 | Sisson | 602/75 |
| 5,996,537 A * | 12/1999 | Caditz | 119/850 |
| 6,142,105 A * | 11/2000 | McKnight | 119/850 |
| 6,234,117 B1 * | 5/2001 | Spatt | 119/850 |
| 6,240,882 B1 * | 6/2001 | Gross | 119/850 |

(Continued)

OTHER PUBLICATIONS

ThunderShirt, 2013, accessed on the Internet Jun. 12, 2013, http://www.thundershirt.com/thundershirt.aspx?utm_expid=16997785-6, 3 pages.

(Continued)

*Primary Examiner* — Yvonne Abbott-Lewis
(74) *Attorney, Agent, or Firm* — Robert G. Crouch; Marsh Fischmann & Breyfogle LLP

(57) ABSTRACT

A pet vest adapted to safely secure weights to a pet to improve the health benefits of exercise and a method for using same.

22 Claims, 5 Drawing Sheets

(56) References Cited

U.S. PATENT DOCUMENTS

| | | | |
|---|---|---|---|
| 6,390,885 B1 * | 5/2002 | Brooks | 450/1 |
| 6,431,123 B1 * | 8/2002 | Hibbert | 119/850 |
| 6,675,743 B1 * | 1/2004 | Jeffrey et al. | 119/850 |
| 6,748,601 B2 * | 6/2004 | LaShoto et al. | 2/102 |
| 7,131,399 B2 * | 11/2006 | Blommel | 119/712 |
| D584,862 S * | 1/2009 | Kemper | D30/145 |
| 7,681,249 B2 * | 3/2010 | Oliver et al. | 2/102 |
| 7,757,641 B1 * | 7/2010 | Worden | 119/856 |
| 7,922,682 B2 * | 4/2011 | Bell et al. | 602/75 |
| 8,156,572 B2 | 4/2012 | Whaley | |
| 8,166,924 B2 * | 5/2012 | Cho | 119/792 |
| 8,261,699 B2 * | 9/2012 | Cho | 119/856 |
| 8,291,867 B2 * | 10/2012 | Blizzard | 119/850 |
| D678,629 S * | 3/2013 | Powell | D30/145 |
| 8,591,275 B2 * | 11/2013 | Gonsalves et al. | 441/106 |
| 8,733,296 B1 * | 5/2014 | Douglas et al. | 119/850 |
| 8,790,154 B2 * | 7/2014 | Blackwell | 450/86 |
| 8,900,032 B2 * | 12/2014 | Punsal | 450/31 |
| 8,944,974 B2 * | 2/2015 | Foster | 482/124 |
| 2002/0121247 A1 * | 9/2002 | Sharpe | 119/820 |
| 2003/0092544 A1 | 5/2003 | Reed | |
| 2003/0177984 A1 * | 9/2003 | Newman | 119/850 |
| 2003/0208832 A1 * | 11/2003 | VandenBerg | 2/102 |
| 2007/0272170 A1 * | 11/2007 | Milson et al. | 119/850 |
| 2008/0040839 A1 * | 2/2008 | Gordon | 2/455 |
| 2009/0183692 A1 * | 7/2009 | Rossi et al. | 119/850 |
| 2009/0292343 A1 * | 11/2009 | Sternlight | 607/112 |
| 2010/0319632 A1 * | 12/2010 | Blizzard | 119/850 |
| 2011/0093003 A1 * | 4/2011 | Lee | 606/201 |
| 2011/0167533 A1 * | 7/2011 | Stewart | 2/102 |
| 2011/0174237 A1 * | 7/2011 | Sanders-Luckman et al. | 119/792 |
| 2011/0231993 A1 * | 9/2011 | Schmid et al. | 5/494 |
| 2011/0302687 A1 * | 12/2011 | Whaley | 2/69 |
| 2012/0022418 A1 * | 1/2012 | Gamboa et al. | 602/19 |
| 2012/0227679 A1 * | 9/2012 | Bishop | 119/850 |
| 2012/0285191 A1 * | 11/2012 | Gallaher | 62/259.3 |
| 2012/0298051 A1 * | 11/2012 | Cho | 119/792 |
| 2013/0186348 A1 * | 7/2013 | Blizzard | 119/850 |
| 2014/0236058 A1 * | 8/2014 | Lee, Jen-shih | 601/84 |

OTHER PUBLICATIONS

LeadDog, Inc. 2013, K9 Topcoat, accessed on the Internet Jun. 12, 2013, http://www.k9topcoat.com/, 2 pages.

MiR Vest, Inc. 2006-2012, MIR Pro weighted vest, accessed on the Internet Jun. 12, 2013, http://www.mirweightedvest.com/.

Century LLC, 2012, UFCÂ® Weighted Vest, accessed on the Internet Jun. 12, 2013, http://www.centurymartialarts.com/Mixed__Martial__Arts/MMA__Equipment/UFC__Weighted__Vest__1540.aspx, 1 page.

Leerburg Enterprises Inc., 2010, Weighted Vest, accessed on the Internet Jun. 12, 2013, http://leerburg.com/792.htm?set=1, 4 pages.

LaGuard 2011, The LaGuard™ Fitness Vest, accessed on the Internet Jun. 12, 2013, http://laguardvest.com/ 1 pages.

* cited by examiner

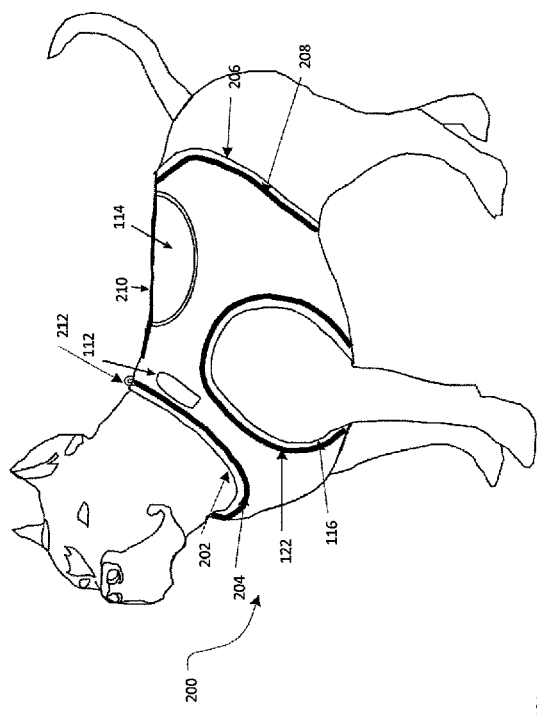
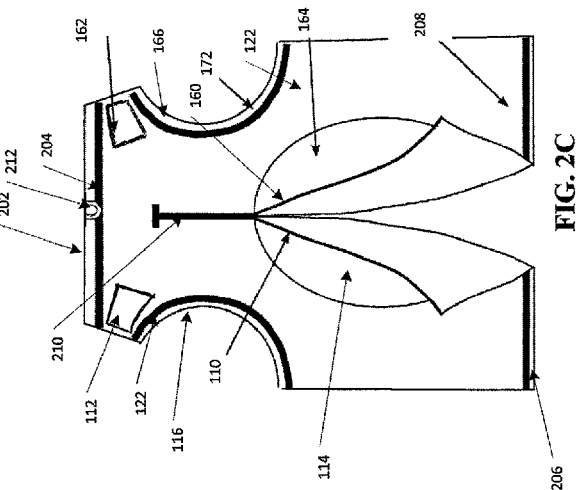
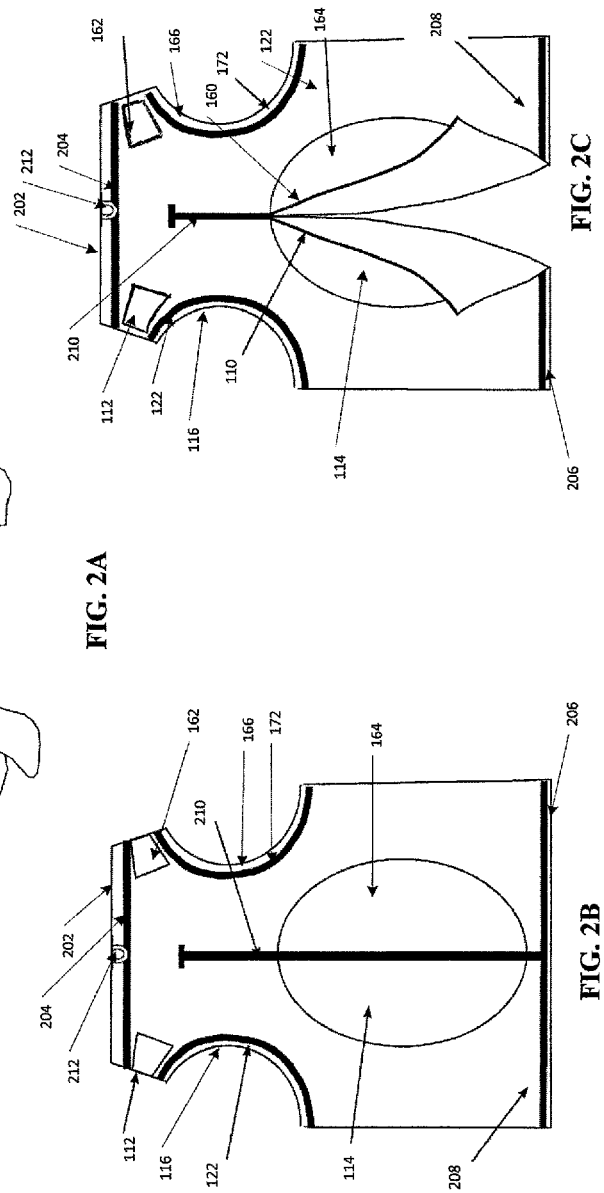
FIG. 2A
FIG. 2B
FIG. 2C

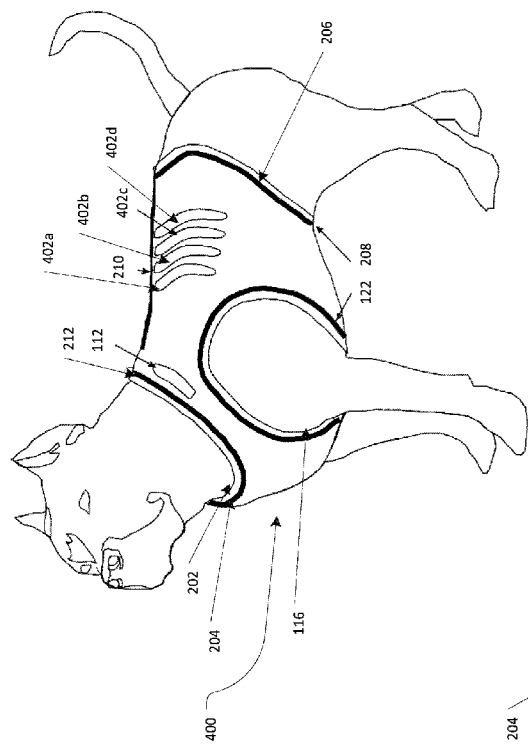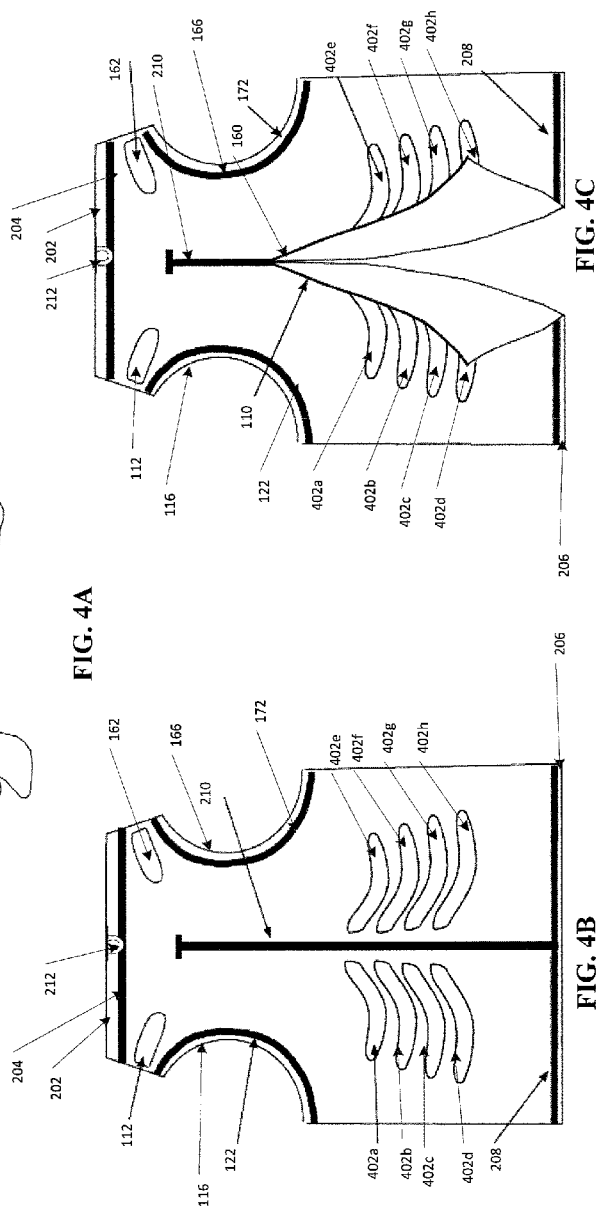

MOTION CONTROL WEIGHTED CANINE FITNESS GARMENT

CROSS REFERENCE TO RELATED APPLICATIONS

This application claims benefit under 35 U.S.C. §119(e) of U.S. Provisional Patent Application Ser. No. 61/690,053 entitled "MOTION CONTROL WEIGHTED CANINE FITNESS GARMENT" and filed on Jun. 18, 2012, the entirety of which is incorporated by reference herein.

INTRODUCTION

The increasing number of overweight and under exercised canines creates well known areas of canine health and fitness devoted to addressing these trends. Current statistics indicate that more than 50 (fifty) percent of the canine population is overweight or obese. Veterinarians also predict that nearly 20 (twenty) percent of middle aged canines and 90 (ninety) percent of senior dogs have osteoarthritis in one or more joints. Preventative measures, such as modifying activities or diet, are sometimes helpful but are not always sufficient to address joint health. However, introduction of weight bearing activities, along with diet and exercise, has been shown to increase muscle strength which in turn promotes joint stability to help reduce the likelihood of canines developing joint diseases. Weight bearing activities also increase endurance and performance by challenging the body at a higher intensity level, and it increases the body's metabolism to burn more calories and jump start weight loss. Additionally, the concept of deep pressure therapy has been used for sensory integration. It is known to offer self-calming and relaxation benefits for children that are easily distracted and hyperactive. The firm hugging sensation provides proprioceptive deep pressure feedback and stability to more positively process sensory stimulus and provide for a more controlled learning environment. The sensation of the pressure seems to act like another layer of connective tissue, sending messages through the body to make breathing easier and increases balance and coordination.

Canines do not have the same reasoning capacity as humans and in many breeds their high drive exceeds acceptable tolerance and their conditioning levels. They are unable to quantify perceived exertion rates or communicate that weights have moved, shifted, or are too heavy to achieve comfort and proper body positioning during movement. Inability to communicate these problems can result in inefficient, or even harmful, weight bearing exercise regimes. In addition, most dog owners do not possess knowledge of a canine's anatomy to ascertain best practices regarding weight application and positioning, to promote optimal comfort, physiological and psychological benefits while reducing risk of injury. Thus, a need exists for a gravity enhanced fitness garment that is anatomically compatible and capable of delivering gradual and progressive safe resistance training while ensuring optimal wearability on the canine. Furthermore, one that incorporates compression material in its design to promote natural, normal canine motion and mechanics while keeping the weight resistance dorsally positioned and stationary relative to a dog's skin; while providing sensory integration benefits and allows for good air flow to minimize overheating.

SUMMARY

In one embodiment, a weighted pet fitness garment is made from a body hugging material. A weight compartment is integrated with the body hugging material and is positioned to optimize the health benefits to the pet using the garment. The garment safely distributes the weights in the garment and keeps the weights in place during use.

In another embodiment, the body type of a pet is evaluated to select a body conforming garment that will snuggly fit the pet. The garment has pockets positioned to properly place any associated load to optimize the health benefits associated with use of the garment while minimising the damage associated with use of the garment. An appropriate weight is selected to optimize the health benefit associated with use of the garment and is placed in the garment pocket. The garment secures the weight in place during exercise.

In another embodiment, the garment has reflective piping.
In another embodiment, the weights conform to the body of the pet.

BRIEF DESCRIPTION OF FIGURES

Preferred embodiments of the present application will now be described by way of example only and with reference to the accompanying drawings of which:

FIG. 2a depicts a first embodiment of a side view of a weighted vest assembled on a canine.

FIG. 2b depicts a top view of the weighted vest of FIG. 2a in a closed state.

FIG. 2c depicts a top view of the weighted vest of FIG. 2a in a partially open state.

FIG. 4a depicts a third embodiment of a side view of a weighted vest assembled on a canine.

FIG. 4b depicts a top view of the weighted vest of FIG. 4a in a closed state.

FIG. 4c depicts a top view of the weighted vest of FIG. 4a in a partially open state.

DETAILED DESCRIPTION

The present application is directed at a motion control weighted canine fitness garment. The motion control weighted canine fitness garment is specially designed to fit like a second skin over the canine anatomy. It supports purposeful placement of its resistance weights that is also by design resistant to motion (relative to the dogs skin) and does not restrict the natural normal movements of the canine thoracic/lumbar regions, or that of the hind or front limbs. Integrated weight placement is based on Kinesio-Taping Methodology practices that have been proven to be therapeutically effective and influential for the musculo skeletal system. This type of methodology influences blood flow, either increasing (when applied in the same direction as the muscle fibers) or decreasing/restricting blood flow (when applied across the muscles fibers). It is used often in the human and canine world to facilitate the body's natural healing process while providing support and stability without restricting range of motion. This methodology best explains why the present application provides two options for weight placement. For the purposes of fitness, weights should promote blood flow and muscle function by lying with the muscle fibers; the opposite technique running across the muscle fibers restricts blood flow and may be used in rehabilitation practice. The motion control weighted canine fitness garment permits the canine to safely engage in normal active canine movements utilizing stabilized weight resistance which prevents excessive weight shifts, chafing or restriction of movement for the benefit of canine health and fitness.

More specifically, the present application describes a garment of the above-mentioned type, comprising a vest shape intended to encompass and conform to a canine's torso. The weighted vest wraps securely around the neck, shoulders, chest, front legs, ribcage, and spine, and employs compression and strategically positioned weighted chambers which are integrated within the garment. The weighted vest is worn by the canine during exercise and other activities. The weight in addition to benefiting canine strength and endurance when combined with the compression material also helps to calm dogs and stimulate the postural muscles of proprioception to encourage the dog to engage their front and hind quarters more efficiently thus enhancing the body's core strength naturally to promote more anatomically correct movements.

Figure 1B:
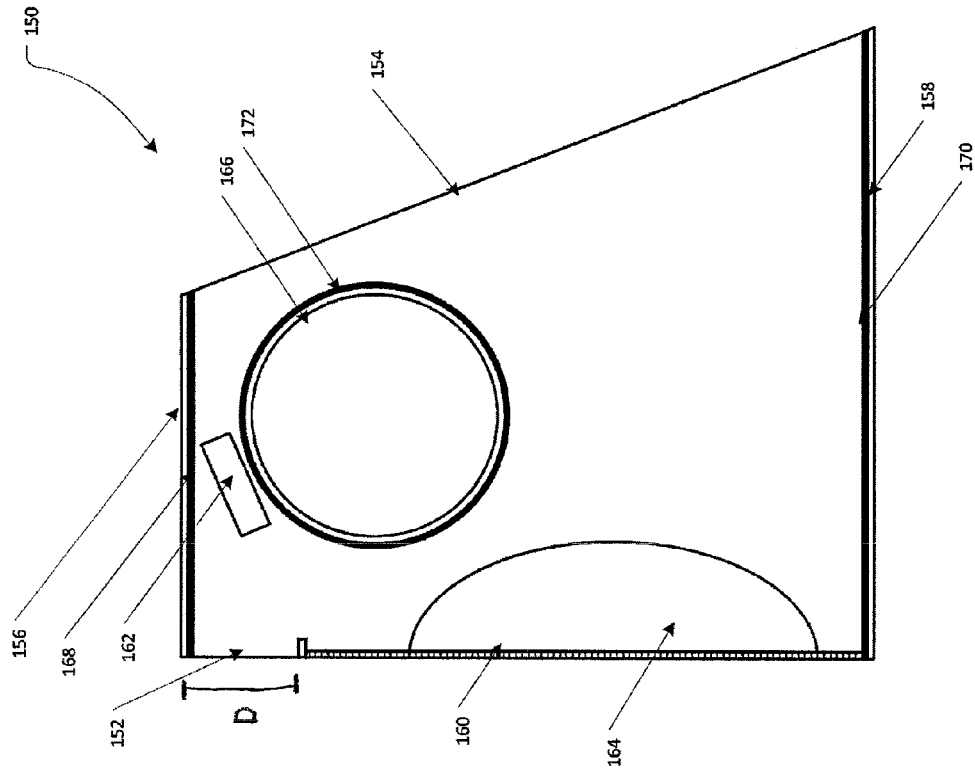
FIG. 1b depicts a right panel of the disassembled weighted vest.
Figure 1A:
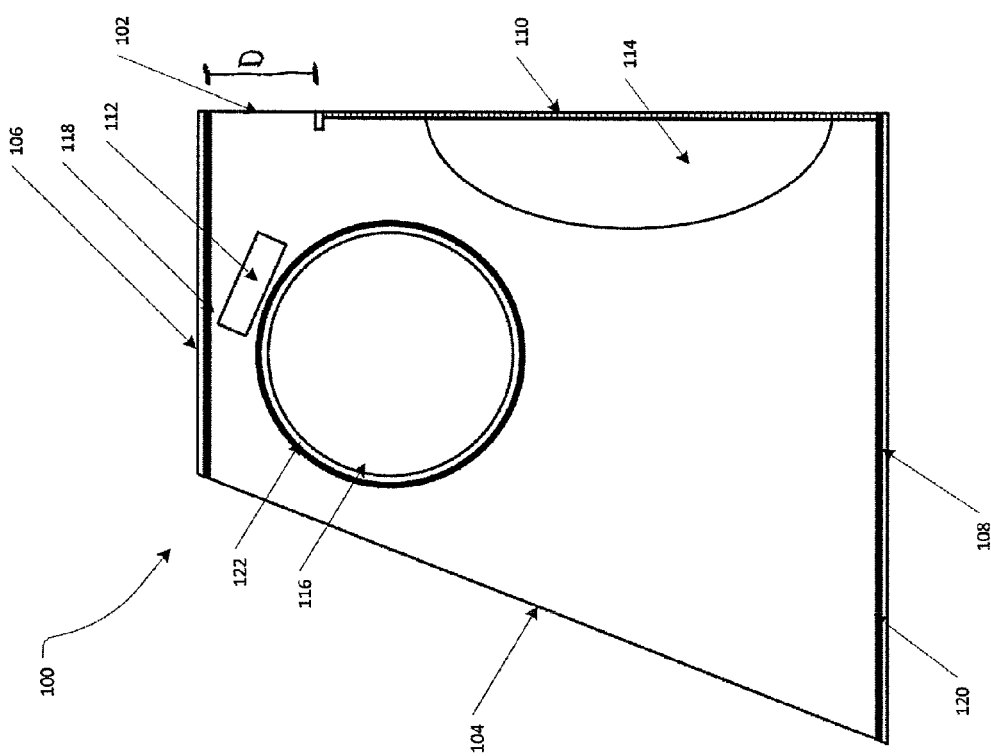
FIG. 1a depicts a left panel of a disassembled weighted vest.

FIGS. 1a and 1b depict a left panel 100 and a right panel 150 of a disassembled weighted vest, respectively. The left panel 100 and the right panel 150 of the weighted vest are comprised of a fabric having stretch and compression properties, such as Lycra™, Spandex™, Neoprene™ or other multi directional stretch material which is, by design, body conforming. Such materials provide natural expansion and contraction to "function like a second skin" on a canine's body during exercise or activity. The stretch and compression properties of the fabric provide a glove like fit and further aid in stabilizing the integrated weights against the body of the canine in a therapeutic hugging manner that stimulate the postural muscles of proprioception. The fitted weighted vest thereby eliminates discomfort caused by the unpredictable strain of unwieldy weight shifts or bouncing during activity. In addition, the left panel 100 and the right panel 150 are further comprised of a breathable fabric, such as Lycra™, Spandex™, that promotes air flow and helps prevent overheating.

As will be discussed in further detail below, the weighted vest is assembled by joining the two panels 100 and 150. The top edge 102 of the left panel 100 and the top edge 152 of the right panel 150 are joined together. Likewise, the bottom edge 104 of the left panel 100 and the bottom edge 154 of the right panel 150 are also joined together. In one embodiment, the top edges 102 and 152 are long enough to cover the vertebra of the canine between the T3 and just past the T11 vertebrae into the early lumbar region. Each of the two panels also has a front edge and a back edge. The front edge 106 of the left panel 100 is joined with the front edge 156 of the right panel 150 when the weighted vest is assembled. When assembled, the front edges 106 and 156 form a circumference large enough for the weighted vest to wrap around the lower neck of the canine. The back edge 108 of the left panel 100 is joined with the back edge 158 of the right panel 150 when the weighted vest is assembled. When assembled, the back edges 108 and 158 form a circumference large enough for the weighted vest to wrap around the abdomen of the canine. The edges may be joined together by one or more fasteners, including but not limited to stitching, zippers, buttons, snaps and hook and loop fasteners (i.e., Velcro®), etc.

The left panel 100 and the right panel 150 each include a closure mechanism along the top edge. As depicted in FIG. 1a, the closure mechanism 110, runs along the top edge 102 of the left panel 108. Specifically, the closure mechanism 110 runs from the back edge 108 of the left panel 100, towards the front edge 106 of the left panel 100. In one embodiment, the closure mechanism 110 runs the entire longitudinal plane of the top edge 102 from the back edge 108 to the front edge 106. In another embodiment, the closure mechanism 110 runs only a portion of the top edge 102, from the back edge 108 to a distance, D, from the front edge 106. The right panel 150, as depicted in FIG. 1b, is likewise configured. Specifically, the closure mechanism 160 runs the longitudinal plane of the top edge 152 from the back edge 158 to the front edge 156. Closure mechanism 160 of the right panel 150 mirrors closure mechanism 110 of the left panel 100 such that the length of closure mechanism 160 is the same as the length of closure mechanism 110. Closure mechanisms 110 and 160 may be any closure mechanisms known in the art, including zippers, buttons, snaps, and hook and loop fasteners, (i.e., Velcro®), etc.

Left panel 100 and right panel 150 further include cutouts 116 and 166. The cutouts 116 and 166 allow the weighted vest to be fitted over a canine's front legs. The cutouts 116 and 166 depicted in FIGS. 1a and 1b are elliptical shaped and are by design not to interfere or restrict shoulder movement. However, it should be appreciated that cutouts may be any shape that allows a canine's front legs to comfortably fit through the weighted vest and shoulder movement to be free and natural.

The panels of the weighted vest may each include one or more weight compartments. The weight compartments may be located in one or more locations on the left panel 100 and the right panel 150. For example, there may be weight compartments positioned on the front part of the shoulders such as compartments 112 and 162. The weighted vest may also include evenly weighted compartments positioned dorsally on either side of the spine as seen in 114 and 164. For fitness and strength enhancing activities the back compartments should run horizontal in its position to the spine to allow for blood flow and span the thoracic and early-lumbar regions, but should not extend into the lower Lumbar/Sacral junction to avoid pressure and hyperextension of the LS (pelvic) joint. The position of the weights is controlled by the body conforming vest material. In one embodiment, compartment 114 is separate from compartment 164. In another embodiment, compartments 114 and 164 are two sections of a single compartment positioned on the back of the canine. Moreover, all compartments 112, 114, 162, and 164 may be fluidly connected to one another. The weight compartments 112, 114, 162, and 164 may be attached to either the outside or the inside of the panels of the weighted vest. As will be appreciated, the present application contemplates any number of weight compartments of any shape in any position on the weighted vest. The structure of the weight compartments will be discussed in further detail below with reference to FIG. 5.

As will also be discussed in further detail below, one or more weight materials may be inserted into each or all of the weight compartments 112, 114, 162, and 164. The weight material may be constructed of any pliable body conforming substrate including, but not limited to sand, weighted gel, bird shot, a combination of the aforementioned, etc. In one embodiment, the weight material is integrated in the weight compartment and not removable. In another embodiment, the weight material may be in a sac or pouch for easy insertion or removal from the weighted compartments 112, 114, 162, and 164. The weight material may also be a thermal material, such as a cooling or heating agent, to alleviate pain or swelling in the canine's muscles or joints. The amount of weight load used as weight material differs based on a canine's size and breed. Canine professionals recommend a weight load capacity from as high as 25% to as low as 10%, of overall body weight for healthy dogs. For gradual, therapeutic and progressive resistance training starting at a level that is < or = to 5% is optimal and will help prevent dog owners from overloading their dog. The weight load may be adjusted by substituting one type, or size, of weight material for a heavier or lighter weight material.

Left panel 100 and right panel 150 may further include reflective piping. Reflective piping may surround the front edges 106 and 156 of the weighted vest, such as reflective piping 118 and 168. Reflective piping may also surround the back edges 108 and 158 of the weighted vest, such as reflective piping 120 and 170. In addition, reflective piping may surround the cutouts 116 and 166, such as reflective piping 122 and 172. Reflective piping may be comprised of a reflective tape, reflective fabric, or any other manner of reflection known in the art.

FIG. 2a depicts a first embodiment of a side view of a weighted vest 200 assembled on a canine. As will be appreciated, the first embodiment of the weighted vest 200 is constructed from left panel 100 and right panel 150 depicted in FIGS. 1a and 1b. As the canine is facing to the left, the left panel 100, and components including weight compartment 112, weight compartment 114, and reflective piping 122 are visible. In a closed state, such as depicted in FIG. 2a, the closure 210 of weighted vest 200 is comprised of connected closure 110 and 160. In addition, the assembled reflective piping 204 now fully encapsulates the assembled front edge 202. Likewise, the assembled reflective piping 208 now fully encapsulates the assembled back edge 206 and closure of 160 and 110. Additionally, the assembled weighted vest 200 may include a loop 212 to which a leash may be attached.

FIG. 2b depicts a front view of the weighted vest of FIG. 2a in a closed state. As can be appreciated from FIG. 2b, the closure 210 is secured when the weighted vest is in the closed state.

FIG. 2c depicts a front view of the weighted vest of FIG. 2a in a partially open state. In a partially open state, part of the closure of weighted vest 200 is open and part of the closure of the weighted vest 210 is closed. As can be appreciated from FIG. 2c, closures 110 and 160 are separated when the weighted vest 200 is in the partially open state. The portion of closure 210 that remains closed when the weighted vest 200 is in the partially open state connects closures 110 and 160 to secure the portion of the weighted vest in the closed state.

Figure 3A:
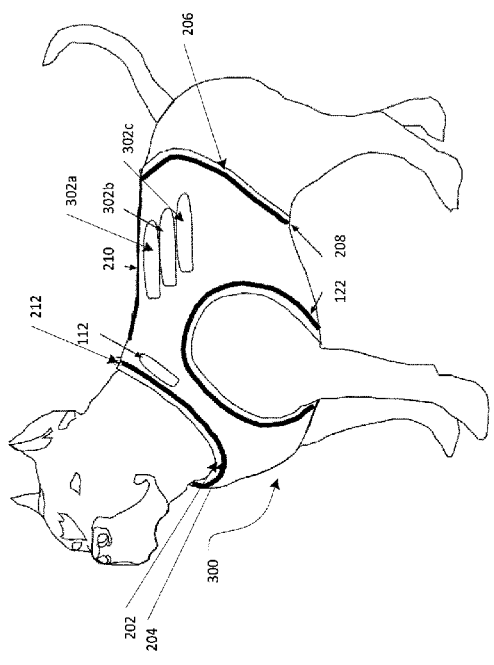
FIG. 3a depicts a second embodiment of a side view of a weighted vest assembled on a canine.

FIG. 3a depicts a side view of a second embodiment of a side view of a weighted vest 300 assembled on a canine. The second embodiment of the weighted vest includes different weight compartments than the weighted vest 200 depicted in FIGS. 2a-2c. Specifically, the main weight compartments comprising three separate weight compartments are located dorsally on the canine. They are integrated horizontal to the spine; the shoulder location for a weight represents other possible locations to elicit additional muscular response and may or may not be included. 302a, 302b, and 302c.

Figure 3C:
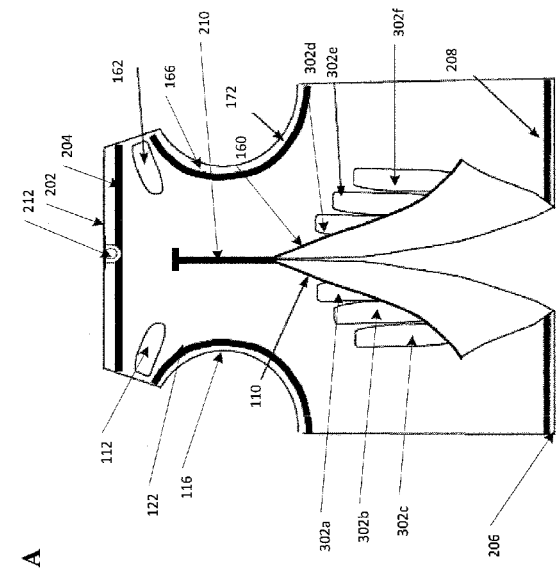
FIG. 3c depicts a topview of the weighted vest of FIG. 3a in a partially open state.
Figure 3B:
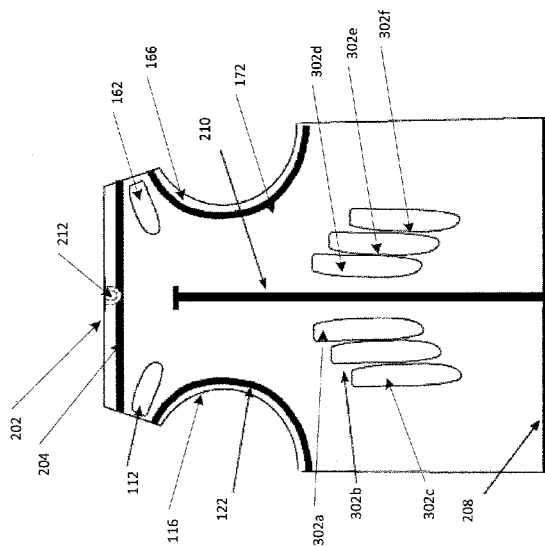
FIG. 3b depicts a top view of the weighted vest of FIG. 3a in a closed state.

FIGS. 3a and 3b depict the different weight compartments when the weighted vest is in a closed state and a partially open state, respectively. As can be appreciated, weighted vest 300 is depicted with six separate weight compartments 302a-f on the back of the canine. However, any number of weight compartments, are contemplated within the scope of the present application.

FIG. 4a depicts a third embodiment of a side view of a weighted vest 400 assembled on a canine. The third embodiment of the weighted vest 400 includes different weight compartments than weighted vest 200 depicted in FIGS. 2a-2c or weighted vest 300 depicted in FIGS. 3a-3c. Specifically, the weight compartments located dorsally on the canine now comprise four separate weight compartments that run vertical in relation to the spine. This vertical position as related to the spine could be desired for use in a rehabilitation application where blood flow may need to be restricted vs. muscle strengthening and enhancement. 402a, 402b, 402c, and 402d.

FIGS. 4a and 4b depict the different weight compartments 402a-h when weighted vest is in a closed state and a partially open state, respectively. As can be appreciated, weighted vest 400 is depicted with six separate weight compartments 402a-h on the back of the canine. However, any number of weight compartments, are contemplated within the scope of the present application.

Figure 5:
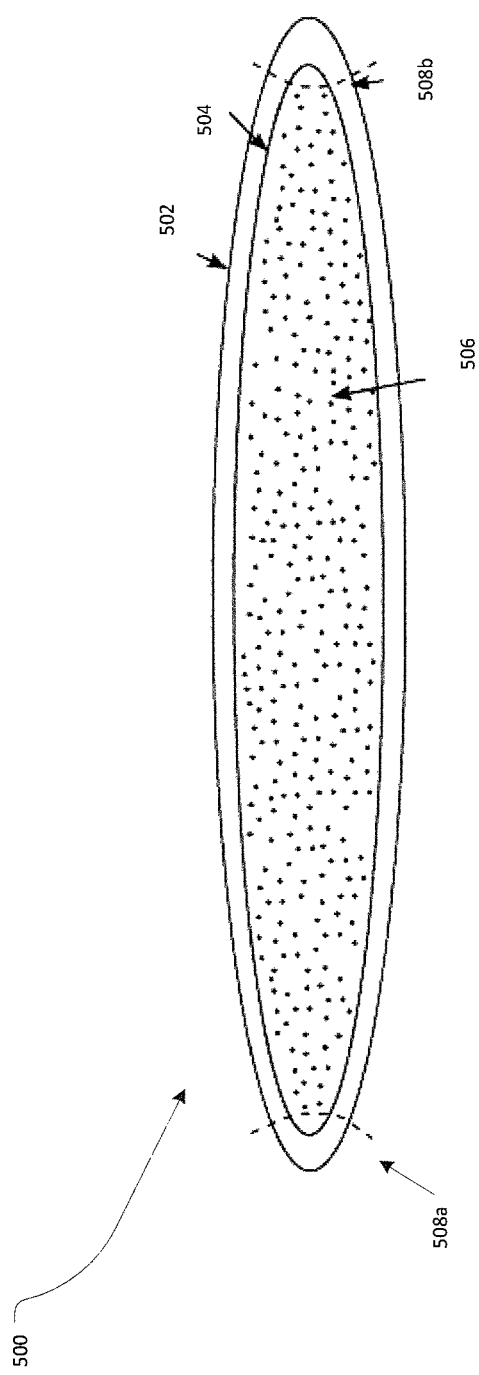
FIG. 5 depicts a cross section of an integrated weight compartment.

FIG. 5 depicts a cross section of a weight compartment 500. Integrated weight compartment 500 is comprised of an outer fabric layer 502 and leak-proof membrane 504. The outer fabric layer 502 covers the leak-proof membrane 504. The outer fabric layer may be any material, including the stretch material of the weighted vest, such as Lycra™ or Spandex™. In FIG. 5, leak-proof membrane 504 is integrated into the weight compartment, and contains the weight material 506 inside the weight compartment 500. As discussed above, the weight material 506 may be directly inserted into the weight compartment 500. In another embodiment, the weight material 506 may be contained in a sac or a bag and may remain separate and removable from the weight compartment 500. In this embodiment, the weight compartment may further include an insertion point into which the weight material may be inserted, or removed, from the weight compartment 500. Weight compartment 500 may be secured to the weighted vest by stich lines 508a and 508b. In one embodiment, the weight compartment 500 is affixed to the inside of the weighted vest. In another embodiment, the weight compartment 500 is affixed to the outside of the weighted vest.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

We claim:

1. A compression garment for pets comprising:
   a compression vest including body hugging material having compressive properties, the compression vest having an inner side facing toward the pet when the compression garment is worn and an outer side facing away from the pet when the compression garment is worn; and
   a pair of compartments, wherein said compartments are integrated with said body hugging material, the compartments being accessible only from the inner side of the compression vest and located in positions on the compression vest dorsally on either side of a spine of the canine, with the positions being symmetrically positioned relative to the spine of the canine,
   wherein said compartments are strategically located to minimize any adverse impact to a wearer of said compression garment;

wherein each of the pair of compartments is elongated along a longitudinal axis that is oriented horizontally when the canine is standing and generally parallel to the spine of the canine.

2. The garment of claim 1, further comprising:
a cutout wherein said cutout is large enough to surround a canine's leg.

3. The garment of claim 2, wherein there are a pair of cutouts, one for each of the canine's front legs, and further wherein the cutouts are oversized to expose not only the canine's front legs, but also to expose the canine's front shoulders.

4. The garment of claim 1, further comprising reflective piping.

5. The garment of claim 1, wherein a thermal agent is placed in at least one of said compartments.

6. The garment of claim 5 wherein said thermal agent has a temperature below ambient.

7. The garment of claim 5 wherein said thermal agent has a temperature above the normal body temperature of the wearer.

8. The garment of claim 1, wherein a body conforming weight material is placed in at least one of said compartments.

9. The garment of claim 8, wherein said weight material is removable from at least one of said weight compartments without damaging said garment.

10. The garment of claim 8, wherein said weight material is steel shot.

11. The garment of claim 1, wherein said body hugging material has multi-directional stretching properties.

12. The garment of claim 1 additionally comprising panels lacking multi-directional stretching properties.

13. The garment of claim 1, wherein each of the pair of compartments is elongated along a longitudinal axis that is oriented generally parallel to a rib of the canine.

14. The garment of claim 1, wherein each of the pair of compartments is located proximate to but offset from the spine of the canine.

15. The garment of claim 14, wherein each of the pair of compartments is located so as to be positioned over epaxial muscles of the canine when the garment is worn by the canine.

16. The garment of claim 1, wherein the body hugging material includes spandex material.

17. A compression garment for pets comprising:
a compression vest including body hugging material having compressive properties, the compression vest having an inner side facing toward the pet when the compression garment is worn and an outer side facing away from the pet when the compression garment is worn; and
a compartment, wherein said compartment is integrated with said body hugging material, the compartment being accessible only from the inner side of the compression vest, and wherein said compartment is strategically located to minimize any adverse impact to a wearer of said compression garment;
wherein a body conforming weight material is placed in said compartment;
wherein said weight material is removable from said weight compartment without damaging said garment;
wherein application of said weight material enhances blood flow.

18. A compression garment for pets comprising:
a compression vest including body hugging material having compressive properties, the compression vest having an inner side facing toward the pet when the compression garment is worn and an outer side facing away from the pet when the compression garment is worn; and
a compartment, wherein said compartment is integrated with said body hugging material, the compartment being accessible only from the inner side of the compression vest, and wherein said compartment is strategically located to minimize any adverse impact to a wearer of said compression garment;
wherein a body conforming weight material is placed in said compartment;
wherein said weight material is removable from said weight compartment without damaging said garment;
wherein application of said weight material decreases blood flow.

19. A method for improved pet exercise, the method comprising:
evaluating the body dimensions of a pet;
selecting a body conforming garment having a pocket that corresponds to said dimensions such that said garment snuggly fits a portion of the body of said pet, said garment having multi-directional stretch properties;
placing said garment on said pet such that said pocket is positioned to increase the health benefit to said pet; and
placing a first body conforming weight in said pocket, said first weight being selected to increase the health benefit to said pet while decreasing the likelihood that said first weight will injure said pet, said garment securing said first weight in place during the desired exercise routine of said pet.

20. The method of claim 19 additionally:
calculating the weight of said pet;
selecting a first body conforming weight;
placing said first body conforming weight in said pocket;
exercising said pet until it is determined that said pet is physiologically ready to increase the amount of resistance needed to improve its fitness;
removing said first body conforming weight from said pocket;
selecting a second body conforming weight that has a mass greater than said first body conforming weight; and
exercising said pet with said second body conforming weight inserted in said pocket.

21. The method of claim 19 additionally comprising the step of:
inserting a thermal agent in said pocket.

22. The method of claim 19 wherein placing said garment on said pet calms said pet.

\* \* \* \* \*